Aug. 13, 1935.  F. REUTTER ET AL  2,010,895
METHOD OF MAKING HOSE MENDERS
Original Filed June 17, 1932
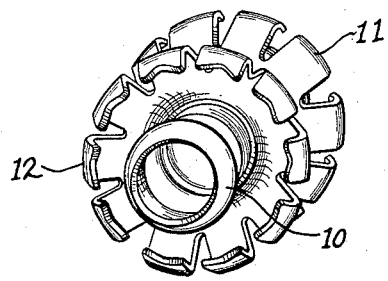
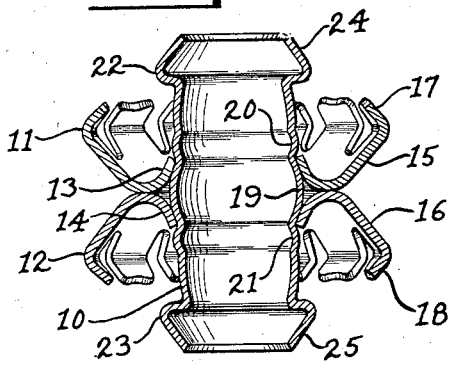
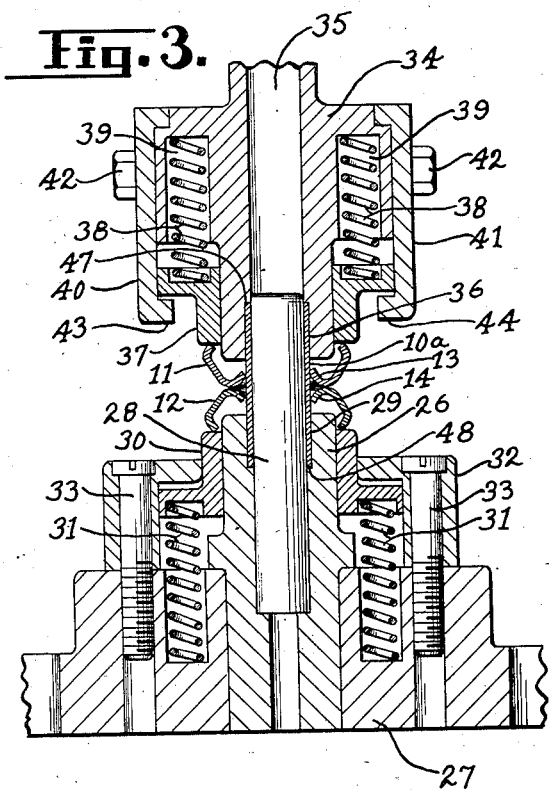
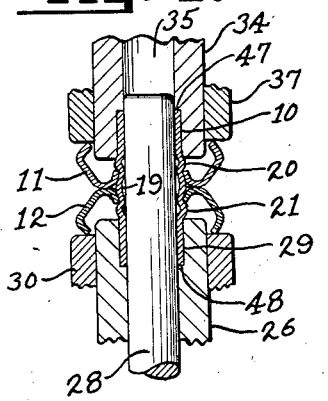
INVENTORS
Frederick Reutter.
BY John H. Goss.
H. G. Manning
ATTORNEY.

Patented Aug. 13, 1935

2,010,895

UNITED STATES PATENT OFFICE 2,010,895

METHOD OF MAKING HOSE MENDERS

Frederick Reutter and John H. Goss, Waterbury, Conn., assignors to Scovill Manufacturing Company, Waterbury, Conn., a corporation of Connecticut Original application June 17, 1932, Serial No. 617,784, now Patent No. 1,919,860, dated July 25, 1933. Divided and this application July 24, 1933, Serial No. 681,853

4 Claims. (Cl. 113—116)

This invention relates to hose connectors, and more particularly to a method of making a clincher hose mender or coupling which may be used to readily connect two sections of hose.

This application is a division of our prior application, Serial No. 617,784, filed June 17, 1932, for "Hose couplings", and which will issue on July 25, 1933, as Patent No. 1,919,860. The invention is an improvement over Patent No. 1,321,323 to Nelson granted November 11, 1919.

One object of the present invention is to provide a hose clincher, coupling or mender of the above nature comprising a pair of clincher hose engaging members, assembled back to back upon a tubular formed blank, the latter having portions expanded outwardly against said clincher members for rigidly securing the parts together.

A further object is to provide a hose clincher coupling or mender of the above nature in which the tubular blank is provided with three outwardly extending ring sections or beads forced into contact with said clincher members, whereby said members will be positively held against rotative or longitudinal movements.

A further object is to provide a hose coupling of the above nature which will be simple in construction, inexpensive to manufacture, easy to install and manipulate, compact, ornamental in appearance, and very efficient and durable in use.

With these and other objects in view there have been illustrated on the accompanying drawing, one form in which the invention may be conveniently embodied in practice.

In the drawing:

Fig. 1 represents a perspective view of the clincher hose coupling or mender.

Fig. 2 is a longitudinal sectional view of the same.

Fig. 3 is a vertical sectional view of the die apparatus used in manufacturing the clincher hose couplings or menders, the parts being shown in their relative positions just prior to the forming operation.

Fig. 4 is a fragmentary sectional view of a portion of the forming dies and the mender after the forming operation has been completed.

Referring now to the drawing in which like reference numerals denote corresponding parts throughout the several views, the numeral 10 indicates a formed tubular blank which comprises the central connecting member in the completed article. Surrounding the middle section of the tubular blank 10 are a pair of hose engaging clincher members 11 and 12 having a pair of oppositely disposed interior collars 13 and 14 which are adapted to slip loosely over the outside periphery of a smooth tubular blank 10a as shown in Fig. 3. The clincher members 11 and 12 are formed with a plurality of outwardly inclined fingers or lugs 15 and 16 having inturned outer pointed ends forming spurs 17 and 17, which are adapted to bite into a hose, not shown, when said fingers 15 and 16 are hammered inwardly against the hose.

In order to permanently secure the juxtaposed clincher members 11 and 12 upon the tubular blank 10a in such a manner as to prevent relative longitudinal sliding of said parts, the blank is adapted to be expanded or buckled outwardly to form three rings or beads 19, 20 and 21, as shown in Figs. 2 and 4, said beads being formed on the outside and inside of said clincher member collars 13 and 14. Moreover, the central apertures in said collars 13 and 14 are preferably made slightly out-of-round or ovalized so as to positively lock the clincher members 11 and 12 against rotation upon said blank 10.

The outer ends of the blank 10 are provided with a pair of enlarged conical beads 22 and 23 having inwardly converging extremities 24 and 25 which are adapted to be inserted within the hose to be connected.

The process of assembling the relative parts of the hose clincher coupling or mender is illustrated by the apparatus shown in Fig. 3 by means of which the smooth tubular blank 10a and the two hose clincher members 11 and 12 are adapted to be assembled. Figs. 2 and 4 show the appearance of the completed hose coupling.

Referring to Fig. 3, the numeral 26 indicates a lower die or anvil supported within a stationary die bed 27. The anvil 26 is provided with a vertical post or mandrel 28 over which the original smooth tubular blank 10a may be readily slipped and seated within a circular socket 29 formed in the upper part of the anvil 26. A sliding sleeve 30 is fitted around said anvil 26 and is adapted to be supported upon a plurality of helical compression springs 31, and said sleeve 30 may be encased within an inverted cup-shaped member 32 secured to the die bed 27, as by screws 33.

Located above and in axial alinement with the stationary anvil 26 is an upper reciprocating die 34 having a central bore 35 slidably fitted over the mandrel 28. The lower part of the central bore 35 is formed with an annular recess 36 adapted to fit over the upper part of the tubular blank 10a. The upper die 34 is also provided with a sliding sleeve 37 which is adapted to be compressed against a plurality of helical springs 38 encased in sockets 39 formed in said die 34.

The sliding sleeve 37 is adapted to be held in place at the lower end of the die 34 by means of a pair of plates 40 and 41 secured to the opposite sides of said die, as by screws 42. The lower edges of the plates 40 and 41 are provided with inturned flanges 43 and 44 against which the sliding sleeve is adapted to engage and be held in operating position.

Operation

In operation, the process of assembling a clincher hose coupling is as follows:

The tubular blank 10a will first be slipped over the vertical mandrel 28 and seated within the circular socket 29 formed in the lower anvil 26. The two clincher members 11 and 12 will next be loosely assembled upon the blank 10a and supported by means of the lower sliding sleeve 30.

The upper die 34 will then be caused to descend and move to the position shown in Fig. 3, whereupon the ends of the tubular blank 10a will be abutted against shoulders 47 and 48 formed at the ends of the recesses 36 and 29 in the upper and lower dies 34 and 26 respectively. As the die 34 continues to descend, the tubular blank 10a will be caused to expand or buckle outwardly forming three locking beads 19, 20 and 21, as clearly shown in Figs. 2 and 4.

It will be understood that since the center apertures in the clincher members 11 and 12 are made slightly non-circular or ovalized, the metal in the tubular blank 10a will be expanded into contact with said apertures so as to produce a positive locking engagement therewith. When the clincher members 11 and 12 have been assembled to the blank 10 by the above described method, the upper die 34 will then be retracted and the formed tubular blank 10 removed from the mandrel by any mechanism, not shown. The ends of the blank 10 will be finally headed into the conical shape shown in Figs. 1 and 2 by mechanism not shown.

While there has been disclosed in this specification one form in which the invention may be embodied, it is to be understood that this form is shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. The method of making a clincher hose coupling which comprises inserting a mandrel snugly with a tubular connecting metal member, applying a pair of clincher members around said connecting member, whereby said connecting member will be supported at a pair of circumferential lines spaced along its length and on the outside thereof, and upsetting the metal of said connecting member outwardly both between and outside said lines, and thereby forming three outwardly extending beads which serve to prevent relative longitudinal movement between said tubular member and said clincher member.

2. The method of making a clincher hose coupling which comprises inserting a mandrel snugly within a tubular metal connecting member, applying a pair of clincher members around said connecting member whereby said connecting member will be supported at a pair of circumferential lines, and upsetting the metal of said connecting member outwardly both between and outside said lines by pressing the ends of said connecting member toward each other in a longitudinal direction to form a plurality of outwardly extending beads which serve to prevent relative longitudinal movement between said tubular member and said clincher members.

3. The method of making a clincher hose coupling which comprises fitting a mandrel within a metal tube, applying a clincher member around said tube for supporting said tube along a circumferential line, and upsetting the metal of said tube outwardly at both sides of said line by pressing the ends of said tube inwardly toward each other in a longitudinal direction to form a pair of outwardly extending beads which serve to prevent relative longitudinal movement between said tubular member and said clincher member.

4. The method of making a clincher hose coupling which comprises fitting a mandrel within a metal tube, applying a pair of hose engaging members having eccentric central apertures around said tube for supporting said tube at a pair of circumferential lines spaced along its length, and upsetting the metal of said tube outwardly both between and outside said lines against the edges of the apertures of said hose engaging members to form three outwardly extending locking beads which serve to prevent relative longitudinal movement between said tube and said hose engaging members.

FREDERICK REUTTER.
JOHN H. GOSS.

CERTIFICATE OF CORRECTION.

Patent No. 2,010,895.             August 13, 1935.

FREDERICK REUTTER, ET AL.

It is hereby certified that error appears in the printed specification of the above numbered patent requiring correction as follows: Page 2, second column, line 5, claim 1, for "with" read within; and that the said Letters Patent should be read with this correction therein that the same may conform to the record of the case in the Patent Office.

Signed and sealed this 10th day of September, A. D. 1935.

Leslie Frazer
Acting Commissioner of Patents.

(Seal)